United States Patent [19]

Stemme et al.

[11] 4,248,511
[45] Feb. 3, 1981

[54] MOTORIZED STILL CAMERA

[75] Inventors: Otto Stemme, Munich; Peter Lermann, Narring; Rolf Schroeder, Baldham; Horst Karl, Munich, all of Fed. Rep. of Germany

[73] Assignee: AGFA-Gevaert, A.G., Leverkusen, Fed. Rep. of Germany

[21] Appl. No.: 8,383

[22] Filed: Feb. 1, 1979

Related U.S. Application Data

[63] Continuation-in-part of Ser. No. 939,374, Sep. 15, 1978, Pat. No. 4,202,616.

[30] Foreign Application Priority Data

Sep. 5, 1977 [DE] Fed. Rep. of Germany ....... 2739930

[51] Int. Cl.³ .......................... G03B 1/12; G03B 7/08
[52] U.S. Cl. ..................................... 354/173; 354/44; 354/213
[58] Field of Search .............. 354/204, 205, 206, 212, 354/288, 213, 173, 170, 275, 44

[56] References Cited

U.S. PATENT DOCUMENTS

| 2,059,032 | 10/1936 | Riszdorfer | 354/44 X |
| 3,135,182 | 6/1964 | Hintze et al. | 354/173 |
| 3,171,338 | 3/1965 | Winkler et al. | 354/173 X |
| 3,385,189 | 5/1968 | Hennig et al. | 354/173 X |
| 3,470,803 | 10/1969 | Fukuoka et al. | 354/173 |
| 3,882,515 | 5/1975 | Mueller | 354/173 |

FOREIGN PATENT DOCUMENTS 1027981 4/1958 Fed. Rep. of Germany ........... 354/173

Primary Examiner—Donald A. Griffin
Attorney, Agent, or Firm—Michael J. Striker

[57] ABSTRACT

A motorized still camera has a housing which can receive film cassettes in a film chamber at the rear side of the housing. A motor-drive of the camera includes a motor which is located forwardly of the cassette take-up section, in direction towards the front side of the camera. A motor-controlling mechanism and a film transporting mechanism of the motor drive are so dimensioned as to require relatively little space in direction vertically of the camera and in direction between the front and rear side, but instead to have their major dimensions extending lengthwise of the housing so as to make optimum use of the space available in the housing.

6 Claims, 1 Drawing Figure

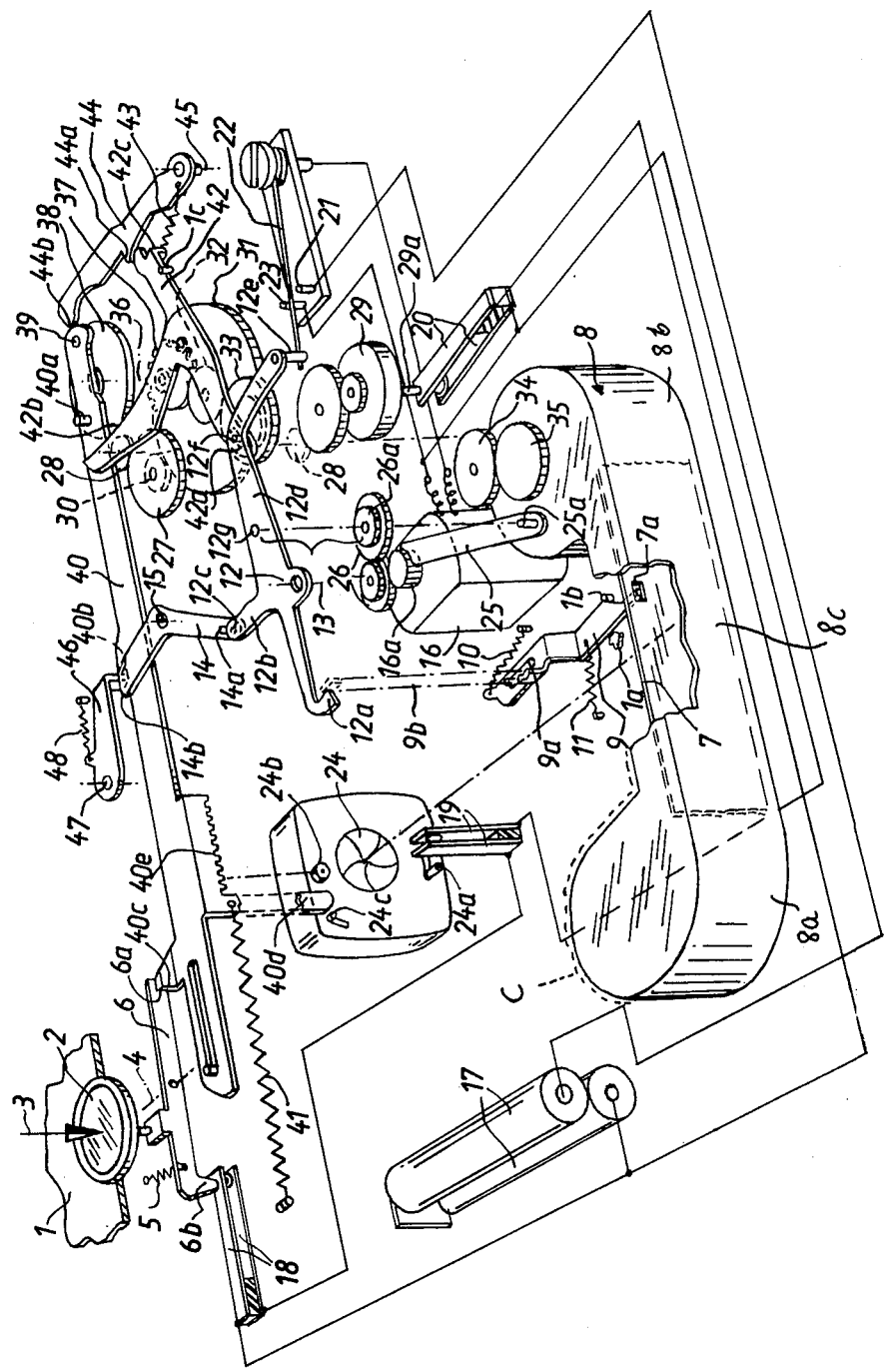

4,248,511

MOTORIZED STILL CAMERA

CROSS-REFERENCE TO RELATED APPLICATIONS

This application is a continuation-in-part of our related application Ser. No. 939,374, entitled "Film Transport System for Photographic Still Camera" and filed Sept. 15, 1978 is now U.S. Pat. No. 4,202,616.

BACKGROUND OF THE INVENTION

1. Field of the Invention

The present invention relates to still cameras.

More particularly, the invention relates to a motorized still camera.

2. The Prior Art

Motorized still cameras are known in the camera art. They may use roll film or film which is contained in film cassettes, e.g. the type of cassette which is known world-wide under the "Type 110" designation.

Still cameras having motor-driven film transport mechanism have many advantages over those wherein film transport, setting of the shutter and/or operation of a flash unit are carried out manually. However, the inclusion of a motor, an energy source for the same and the various motion-transmitting components makes the dimensions of such cameras of necessity relatively large, a disadvantage which at least to a significant extent counteracts the advantages obtained by inclusion of the motor drive.

This is particularly noticeable in the case of still cameras using film cassettes, a type of camera often referred-to as a "pocket camera". One of the particular advantages of such cassettes has been that they permitted the development of cameras small enough to be conveniently carried on the person of a user, often in a pocket (hence the name "pocket camera"). Evidently, any enlargement of the overall size of such cameras, resulting from the inclusion of a motor drive, is highly undesirable since it will defeat the original purpose, the concept of miniaturizing the camera to the point where it can be conveniently carried about on the person of a user. Yet, in the miniature (e.g. 110-type) cameras which have heretofore been motorized, this is exactly what has happened.

SUMMARY OF THE INVENTION

It is a general object of the present invention to overcome the above described disadvantages.

More particularly, it is an object of the invention to provide a motorized still camera whose overall dimensions—even in the case of a miniaturized camera—do not exceed those of a similar but non-motorized camera, or do so only very slightly.

Another object of the invention is to provide a motorized still camera which, utilizing the optimizing aspects of the disclosure herein, may even be smaller than many of the known non-motorized still cameras having the same picture format.

Pursuant to these objects, and still others which will become apparent hereafter, one feature of the invention resides, in a motorized still camera, in a combination comprising a camera housing having a front side and a rear side and, adjacent the rear side, a compartment for a film supply section and a film take-up section; a motor drive, including a film transporting mechanism in the housing; and electric motor means operatively connected with the film transporting mechanism for driving the same, the electric motor means being located in the housing forwardly of the film take-up section in direction towards the front side.

The novel features which are considered as characteristic are set forth in particular in the appended claims. The invention itself, however, both as to its construction and its method of operation, together with additional objects and advantages thereof will be best understood from the following description of specific embodiments when read in connection with the accompanying drawing.

BRIEF DESCRIPTION OF THE DRAWING

The single FIGURE is an exploded perspective view, not to scale, illustrating a camera in accordance with the present invention.

DESCRIPTION OF THE PREFERRED EMBODIMENT

In the FIGURE the reference numeral 1 denotes a portion of the housing of a still camera; the illustration is symbolic of the entire camera housing. The camera housing is provided with a release button (or diaphragm) 2 which, when depressed in the direction of arrow 3, presses down upon a lateral tab on the left arm of a double-armed lever 6. The lever 6 is pivoted about a stationary pin 4 and is urged clockwise by a tension spring 5. The left end 6b of lever 6 serves as a switch activator.

The illustrated camera is for use with film 7 of the type having one perforation 7a per film frame. In this embodiment the film 7 is accommodated in a cassette 8 (e.g. of the type 110) comprising a film supply compartment 8a, a film take-up compartment 8b, and an intermediate bridge 8c joining these compartments and being provided with an exposure window (not shown). The cassette 8 is located in a compartment (diagrammatically shown by the dashed line C) at the rear side of the camera housing 1; the front side being provided with a picture-taking lens (not shown). The camera includes a stationary stop 1a and stationary camming pin 1b, between which a feeler 9 can move. The feeler 9 has an elongated slot 9a through which a stationary pin extends (not shown) which mounts the feeler for horizontal pivoting movement about the axis of the pin as well as for horizontal shifting movement towards and away from the film 7. A tension spring 10 pulls the feeler 9 towards the film 7, and another tension spring 11 pulls the feeler 9 leftwards, i.e., opposite to the direction of film transport. Feeler 9 has a bent-up arm 9b the free end of which is located in the vicinity of one arm 12a of a triple-armed control lever 12. To facilitate visualization in this exploded perspective view the vertical arm 9b is shown in broken lines as elongated up beyond its actual length, so as to make clear its cooperation with the lever arm 12a. Control lever 12 is mounted for horizontal pivoting movement about an axis 13 defined by a stationary vertical pin (not shown). The second arm 12b of lever 12 carries a pin 12c which extends into a slot 14a at the end of a double-armed lever 14, the latter being mounted for horizontal swinging movement about an axis 15 defined by another stationary pin (not shown). The third arm 12d of the control lever 12 is angled off as shown and at its end carries a downwardly extending switch-control pin 12e. Control lever 12 also has an aperture 12g in its arm 12d.

An electric motor 16 is provided to drive the illustrated film-transport system, and is energized by e.g. batteries 17. A switch 18 is connected in the current path between motor 16 and batteries 17; switch 18 closes when pressed down by the left end 6b of lever 6, upon depressing of the release member 2. Connected in series with switch 18 is another switch 19 and connected in parallel to the series-combination of switches 18, 19 is still a further switch 20. An additional switch 21, 22 is connected in series with the parallel combination of switches 18, 19 and 20; it comprises a stationary contact 21 and a moving contact 22. Moving contact 22 also cooperates with a further stationary contact 23, so as to act as a changeover switch. Thus, engagement of the moving contact 22 with the stationary contact 23 directly short-circuits the drive motor 16.

The shutter unit of the camera is designated with reference numeral 24. It has a wind-up pinion 24b which, when it is turned counterclockwise, idles but when it is turned clockwise, winds-up or otherwise sets the shutter via an internal one-way coupling. When the shutter unit 24 is in wound-up or set condition, the shutter can be actuated by moving a shutter-trigger pin 24c from its illustrated position towards the other end of the slot through which it projects, whereupon the shutter will open and then close, after which the shutter unit 24 must then be wound-up or set again. In addition, the shutter unit 24 also has a switch-actuating pin 24a projecting through a slot. When the shutter unit 24 is in set condition, i.e., ready to be triggered, the switch-actuating pin 24a is at the left end of its slot, as illustrated. When the shutter unit 24 is triggered, switch-actuating pin 24a moves to the right, engaging and closing the electrical switch 19 at or near the end of the shutter operation.

The motor 16 has an output pinion 16a which drives a speed-reducing transmission. The transmission comprises two dual-diameter gears 26, 26. The drive pinion 16a meshes with the larger-diameter part of the first dual-diameter gear 26; the smaller-diameter part 26a of the first dual diameter gear meshes with the larger-diameter part of the second dual-diameter gear and the smaller-diameter part 26a of the second dual-diameter gear meshes with a gear 27 (shown further above in the exploded view). Gear 27 in turn meshes with the gear 28 of a centrifugal-force switch 29. To facilitate visualization, gear 28 is illustrated twice, once with a solid lead line to show its cooperation with gear 27, and once with a broken line to show its cooperation with centrifugal-force switch 29. The switch 29 has a downwardly extending switch-actuating pin 29a. Whenever the motor 16 is running, pin 29a presses down upon the electrical switch 20, keeping the same closed; whenever the motor 16 is not running, the switch 20 is open. Reference numeral 25 designates a braking lever, one end of which can move into and out of engagement with the motor drive pinion 16a. The other end of braking lever 25 carries a pin 25a which extends upwards through the aperture 12g in control lever 12. Braking lever 25 either brakes or does not brake the motor drive pinion 16a, depending upon the position of control lever 12, as described below.

Rigidly coupled to gear 27 is a smaller-diameter gear 30 which may, e.g., be of one piece therewith. Gear 30 meshes with a larger gear 31. Rigidly coupled to the gear 31 is a smaller diameter gear 32, e.g., of one piece therewith. Gear 32 drives a gear 35 via intermediate gears 33 and 34. Gear 35 is coupled to and drives the take-up core located in the interior of the take-up end 8b of the cassette 8.

A gear segment 37 and a crankwheel 38 are both mounted for rotation about a common stationary pin, as indicated at 36. They are also rigidly coupled to each other so as to share rotation. Depending upon the angular position of crankwheel 38, gear segment 37 does or does not mesh with gear 27. When the gear segment 37 meshes with gear 27, it is driven by the latter.

The crankwheel 38 carries an eccentrically located pin 39 on which the right end of a long crank rod 40 is pivotally mounted. Crank rod 40 carries a vertical camming pin 30a. Approximately midway between its right and left ends, crank rod 40 has a rearwardly extending projection, the left edge 40b of which acts as a holding edge for purposes to be described below. Near its left end, crank rod 40 has a bent-up vertical tab, the left edge 40c of which acts as a trigger edge. At its left end, crank rod 40 has an elongated slot through which a stationary vertical pin (no reference numeral) projects which guides crank rod 40 for lengthwise displacement. Near its left end the crank rod 40 has a bent-down part, the bottom edge of which is configured as a rack 40e which meshes with the wind-up or setting pinion 24b of the shutter unit 24. A tension spring 41 is connected to this bent-down part of crank rod 40 and pulls the crank rod 40 leftward, i.e., in the direction opposite to the wind-up direction for wind-up pinion 24b. This bent-down part of crank rod 40 extends further down as a trigger arm 40d. When crank rod 40 moves to the left, trigger arm 40d displaces pin 24c, thereby triggering the shutter unit 24.

A second triple-armed lever is designated with reference numeral 42. The first arm 42a of this lever has a slot, through which extends a vertical pin 12f carried by the arm 12d of the control lever 12. The second arm of lever 42 is located in the path of movement of pin 40a and its right edge is configured as a camming surface 42b. The third arm of lever 42 has a holding edge 42c. A tension spring 43 pulls lever 42 towards a stationary stop 1c. Numeral 44 denotes a one-armed lever mounted for horizontal pivoting movement about a vertical pin, as indicated at 45. One end of the spring 43 is connected to the lever 43, and its other end is connected to the one-armed lever 44. The latter has a leftwards projection, a back edge 44a of which is a blocking edge. Spring 43 pulls the blocking edge 44a towards the holding edge 42c and also pulls the rear end 44b of lever 44 towards the right end of the crank rod 40. Reference numeral 46 identifies a further one-armed lever which is mounted for pivoting movement about a stationary pin, as indicated at 47. The rearward end of lever 14 has a rearwards facing control edge 14b. A tension spring 48 pulls the lever 46 towards the control edge 14b and into a position blocking the holding edge 40b of the crank rod 40.

The film-transport system of the camera is shown in the FIGURE in the setting which it assumes upon completion of a film-transport operation. The electrical switches 18, 19, 20, 21 are all open, and the motor 16 is short-circuited by the switch 22, 23. The blocking edge 6a of the trigger lever 6 blocks the trigger edge 40c of the crank rod 40, holding the latter in its cocked position, i.e., with tension spring 41 stretched as shown. The front end of feeler 9 extends into a film-frame perforation 7a. Because of this, and via the engagement between arm 9a and arm 12a, lever 12 causes double-armed lever 14 to push, at its rearwards control edge 14b, against the one-armed lever 46, keeping the latter swung away from the holding edge 40b; i.e., in the illustrated setting of the system, the crank rod 40 is not blocked at its holding edge 40b.

If, now, the user depresses the release member 2, the trigger lever 6 swings counterclockwise and its switch-actuating part 6b closes the switch 18. Switch 18 stays closed as long as the element 2 continues to be depressed. At the same time, blocking edge 6a moves up out of the path of trigger edge 40c, thereby releasing the crank rod 40. Tension spring 41 begins to pull crank rod 40 leftwards, i.e., opposite to the film-transport direction. As a result the crankwheel 38 and with it the gear segment 37 begin to turn. As crank rod 40 moves leftward, its downwardly projecting trigger arm 40d displaces trigger pin 24c leftwards, thereby triggering a shutter operation. Upon completion of the shutter operation, pin 24a closes switch 19, so that now both switches 18, 19 are closed.

Simultaneously with the foregoing, the first tooth of gear segment 37 has begun to mesh with gear 32. Also, the pin 40a on crank rod 40 has engaged the camming surface 42b of the second double-armed lever 42 and has swung the lever 42 counterclockwise to such an extent that the blocking edge 44a of one-armed lever 44 latches in front of the holding edge 42c of the lever 42 and holds that lever in position. Also, this counterclockwise swinging of lever 42, due to the pin and slot coupling at 42a, 12f, has caused the first triple-armed lever 12 to turn clockwise so that its arm 12a has moved back and unblocked arm 9b and also caused braking lever 25 to move away from motor drive pinion 16a.

Because of this clockwise displacement of lever 12, its pin 12e ceases to press the springy movable contact 22 into engagement with stationary contact 23, so that contact 22 due to its own spring action has now moved into engagement with stationary contact 21. Because the three switches 18, 19 and 21, 22 are now all closed, the motor 16 begins to operate. However, as soon as motor 16 starts up, the switch-actuating pin 29a of centrifugal switch 29 closes switch 20, and keeps switch 20 closed so long as the motor is running. Accordingly, the user can now disengage the release member button 2 and although switch 18 then opens, the switch 20 being connected in parallel to the series combination of switches 18, 19 keeps the motor 16 energized. Because of this, when switch 19 later opens also, i.e., upon resetting of the shutter unit 24, this likewise will not terminate motor energization.

With the motor 16 running, the crankwheel 38 is driven counterclockwise, via the gear segment 37 and the gear 32. As a result, the crank rod 40 is pulled rightwards, i.e., in the film-transport direction, against the opposition of tension spring 41. Also, through the intermediary of gears 31-35, the take-up spool in the section 8b of film cassette 8 is turned, resulting in film transport.

During the first phase of such film transport, the part of film 7 just upstream of film perforation 7a pushes the end of perforation feeler 9 rightwards, but as this happens the camming pin 1b is engaged by the slanting camming surface at the right edge of feeler 9, causing feeler 9 to retract away from the film 7. As soon as the feeler 9 has emerged from film perforation 7a, tension spring 11 pulls feeler 9 leftwards until feeler 9 abuts the stop 1a. As a result, feeler 9 cannot enter a second time into this same film perforation 7a. Instead, under the action of its springs 10, 11, the feeler 9 is pressed leftwards against stop 1a and forwards against the film 7.

With feeler 9 in this setting during the film-transport operation, the tension spring 43 is urging the lever 42 clockwise and the latter in turn urges the lever 12 counterclockwise, with the front edge at the very end of arm 12a being pressed against the back edge of arm 9b, so that feeler 9 is additionally pressed against film 7 from behind. Also, because arm 12a is pressing against arm 9b, lever 12 cannot turn further in counterclockwise direction and the lever 42 cannot turn further in clockwise direction, i.e., despite the pull exerted upon lever 42 by tension spring 43. As a result, neither of the three-armed levers 12, 42 can leave the position just described during the remainder of the film-transport operation, i.e., even when, somewhat later during the rightwards travel of crank rod 40, pin 40a no longer blocks lever 42 against clockwise movement and blocking edge 44a likewise no longer blocks lever 42 against clockwise movement. It will be understood that the blocking edge 44a ceases to block clockwise movement of lever 42 when the right end of crank rod 40 displaces the free end 44b of one-armed lever 44 rightwards. Also, with the lever 12 arrested in the position just described, it can no longer push one-armed lever 46 back via the lever 14. As a result, the free end of one-armed lever 46 is not being pushed back out of the path of movement of holding edge 40b. This makes it impossible for the tension spring 41 to again pull crank rod 40 leftwards prior to completion of the still ongoing film-transport operation.

During rightward movement of the crank rod 40, i.e., in the film-transport direction, its rack 40e drives the wind-up pinion 24b clockwise, thereby winding-up or otherwise setting shutter unit 24 to a condition in which the unit 24 is again ready to be triggered. With the shutter unit 24 thus reset, switch-actuating pin 24a reassumes its illustrated position, permitting the electrical switch 19 to open. As mentioned just above, because the series-connected switches 18, 19, both of which are now open, are shunted by closed switch 20, the drive motor 16 continues to be energized.

During the leftwards and then rightwards movement of crank rod 40, pin 40a slides along the cam surface 42b of three-armed lever 42 until, on completion of one rotation of crankwheel 38, the crank rod 40 has returned to the position illustrated in the FIGURE. The gear segment 37 has by then turned to such an extent that it now ceases to mesh with gear 32, and the right end of crank rod 40 pushes the free end of one-armed lever 44 leftwards against the force of tension spring 43, as a result of which the blocking edge 44a moves rightwards out of the path of holding edge 42c, thereby releasing the lever 42.

At this stage the film-transport operation has not yet been completed and the arm 12a is pressing forwards against the arm 9b of feeler 9, which latter continues to be pressed against the film 7. Due to this, the levers 12, 42 still cannot return to their starting positions, the switches 20 and 21, 22 continue to stay closed, and the motor 16 continues to operate. When, finally, upon completion of the one-frame film-transport operation, the feeler 9 enters into the next film-frame perforation 7a, this movement of the feeler 9 now allows the lever 12 to turn counterclockwise and therefore the lever 42 is permitted to turn clockwise. When lever 12 turns counterclockwise its switch-controlling pin 12e moves springy contact 22 out of engagement with stationary contact 21, thereby terminating motor energization, and furthermore into engagement with stationary contact 23, thereby short-circuiting the motor. The kinetic energy of the motor is then almost instantly converted into dissipated electrical energy, and the motor therefore comes to a standstill. As a result, the pin 29a of centrifugal-force switch 29 rises, permitting switch 20 to open again, at which point all switches in the motor-current path are in open setting. During the turning of lever 12 the braking lever 25 has come into engagement with the motor output pinion 16a, and the rearwards facing control edge 14b of lever 14b has once again pushed one-armed lever 26 rearwards out of the path of movement of the holding edge 40b of crank rod 40. At this point, both the shutter operation and the film-transport operation are entirely completed, and the film-transport system is once more in the setting shown in the FIGURE.

If the camera is to operate in the sequential-exposure mode, the user maintains trigger button 2 depressed for as long as the exposure sequence is to continue. Each constituent shutter operation and film-transport operation is then performed in the manner already described, but with switch 18 staying uninterruptedly closed and the blocking edge 6a being uninterruptedly located out of the path of movement of trigger edge 40c. During the time interval between the completion of one complete rotation of crankwheel 38 and the termination of a film-transport operation, the gear segment 37 does not mesh with gear 32 and the one-armed lever 46 is located in the path of movement of holding edge 40b, i.e., until the feeler 9 enters into the next film-frame perforation 7a; this serves to assure that the crank rod 40 cannot again be triggered until the still ongoing film-transport operation is finished, i.e., until feeler 9 enters the next perforation.

When cassette film 7 of the type shown is employed, the trailing end of the film 7 cannot be pulled out of the supply compartment 8a into the take-up compartment 8b of the cassette 8. When this point is reached, the lever 12 assumes its film-transport setting, because the feeler 9 is presented with no next perforation into which to enter. Because the film 7 in the cassette 8 cannot be transported any further, the film-transport system blocks, and the drive motor 16 comes to a halt. As a result the centrifugal-force switch 29 opens switch 20, and motor energization terminates. If thereafter the user lets go of trigger button 2 and then inserts a fresh cassette 8 into the camera, all components will reassume the positions shown in the FIGURE.

If no cassette 8 is present in the camera, the feeler 9 is held against stop 1a, and is displaced forwards, i.e., in the direction towards where film 7 would normally be, by a distance corresponding to the length of its slot 9a. As a result lever 46 is kept pushed back, out of the path of movement of holding edge 40b. In itself this is without significance because the trigger edge 40c is blocked by blocking edge 6a. If it is now desired to demonstrate the operation of the camera, e.g., to a potential purchaser, with no film cassette present in it, the user presses release member 2 and the sequence of operations described above will then occur in substantially the same way. The switch 21, 22 is kept closed, until completion of one rotation of crankwheel 38, by means of the lever 44 via the second triple-armed lever 42. Without performing an actual film transport the shutter unit 24 is triggered, the motor switches 18, 19, 21-22 and 20 close in sequence, the motor operates, the shutter unit 24 is reset and the motor stops with the switches opening in sequence in the way already described.

Because of the arrangement and cooperation of the components of the motor drive in the illustrated manner, the overall dimensions of a camera embodying the invention can be very much smaller than those known from conventional motor-driven still cameras. In fact, they need not exceed—or exceed at most very slightly—the overall dimensions of many manually operated still cameras using the same film format.

Particularly advantageous is the fact that the motor 16 is located—as considered with reference to the optical axis of the camera—behind (i.e., forwardly relative to the front side of the camera) the take-up section 8b of film cassette 8. This permits the motor and the other components of the motor drive to be accommodated in the housing 1 in an especially space-saving manner. Also, the construction of all gears used in the drive as flat, essentially disk-shaped members, reduces the height required for the arrangement so that the camera housing can be rather flat. The same is true of the elements 9, 12, 40, 42 and 44 which control the operation of motor 16; since they are all flat slides or levers the combined space required for their installation (i.e., in vertical direction in the FIGURE) is equal to or smaller than the space required in the same direction by the gears 16a and 26-38, i.e., they do not add to the height of the camera.

The batteries 17 are advantageously located at that side of the camera housing 1 in which the supply section 8a of the cassette 8 is accommodated—and which is remote from the motor-drive components and thus has available space for the accommodation of the batteries. It is especially favorable if, when the batteries 17 are of the rod-shaped cylindrical type as shown (e.g., type AAA) they are located laterally of the supply section 8a and their longitudinal axes extend parallel or substantially parallel to the optical axis of the camera.

Due to the angular positioning of the various pivot axes and axes of rotation of the motor-drive components, as well as because of the dimensioning of the lengths and the positioning of the bearing locations for the components, the entire motor drive requires—as shown in the FIGURE—relatively little space lengthwise of the optical axis of the camera; instead, it extends parallel to the elongation of the cassette 8 (i.e., of the camera housing 1). This means that the motor-drive arrangement makes the best possible use of the available space, in that its maximum dimension coincides with the maximum dimension of the available space, i.e., with the elongation of the camera housing.

While the invention has been illustrated and described as embodied in a still camera of the "pocket type" and which uses cassette film, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motor-driven still camera, a combination, comprising a camera housing having a front side and a rear side and, adjacent said rear side, a compartment for a film supply section and a film take-up section, said film take-up section having a spool-rotating gear; a motor drive, including a film transporting mechanism in said housing and a drive pinion; and electric motor means operatively connected with said film transporting mechanism for driving the same, said electric motor means being located in said housing forwardly of said film take-up section in direction towards said front side, said film transporting mechanism including a gear train for transmitting motion from said drive pinion to said spool-rotating gear, the gears of said gear train all being configured as disk-shaped gears so as to reduce the height and therefore the overall vertical space requirement of said gear train in said housing.

2. A combination as defined in claim 1, wherein said compartment is adapted to accommodate a film cassette having said film supply and film take-up sections.

3. A combination as defined in claim 2, the film supply section and the film take-up section of the film cassette being located in opposite lateral sides of the camera housing when the cassette is in said compartment; further comprising a source of electrical energy for said motor and being located on the same side of said housing as the film supply section of the cassette.

4. A combination as defined in claim 3, said source including rod-shaped cylindrical batteries located laterally of the film supply section and having longitudinal axes extending in direction from one to the other of said front and rear sides of the housing.

5. A combination as defined in claim 2, said motor drive including a motor controlling mechanism, and wherein said motor controlling mechanism and said film transporting mechanism have a first dimension in direction from one to the other of said front and rear sides which is relatively small, and a second dimension parallel to said front and rear sides and to the elongation of the cassette which is relatively large.

6. A combination as defined in claim 1, further comprising a shutter and a shutter release; and wherein said motor drive includes a plurality of movable components cooperating with one another and with said motor, shutter and shutter release to control the operation of said motor in dependence upon operation of said shutter release and shutter, all of said movable components being flat sliders or levers and having a combined height, in vertical direction of said housing, which is at most equal to the height of said gear train.

* * * * *